US005411569A

United States Patent [19]

Hjersted

[11] Patent Number: 5,411,569

[45] **Date of Patent: * May 2, 1995**

[54] IRON HUMATE PRODUCT

[75] Inventor: Lawrence N. Hjersted, Bartow, Fla.

[73] Assignee: Kemiron, Inc., Bartown, Fla.

[ * ] Notice: The portion of the term of this patent subsequent to Apr. 12, 2011 has been disclaimed.

[21] Appl. No.: 213,180

[22] Filed: Mar. 14, 1994

Related U.S. Application Data

[63] Continuation-in-part of Ser. No. 18,287, Feb. 16, 1993, Pat. No. 5,302,180, which is a continuation of Ser. No. 751,872, Aug. 28, 1991, Pat. No. 5,213,692.

[51] Int. Cl.[6] .......... C05F 11/02

[52] U.S. Cl. .......... 71/24; 71/28; 71/59; 71/DIG. 2; 210/710; 210/724; 210/917

[58] Field of Search .......... 71/24, 28, 59, DIG. 2; 210/609, 702, 710, 723–728, 770, 917

[56] References Cited

U.S. PATENT DOCUMENTS

| | | | |
|---|---|---|---|
| 1,757,526 | 5/1930 | Hedgepeth | 210/917 |
| 2,317,990 | 5/1943 | Grether | 71/10 |
| 3,736,255 | 5/1973 | Ghassemi et al. | 210/917 |
| 3,872,002 | 3/1975 | Musgrove | 71/13 |
| 3,985,536 | 10/1976 | Abbe et al. | 71/24 |
| 4,668,404 | 5/1987 | Walterick, Jr. | 210/666 |
| 4,743,287 | 5/1988 | Robinson | 71/12 |
| 5,213,692 | 5/1993 | Hjersted | 210/709 |
| 5,302,180 | 4/1994 | Hjersted | 210/710 |

OTHER PUBLICATIONS (ISSN 0065–2393), Aquatic Humic Substances, pp. xvii––xxx, 83–105, 281–295, 385–408, 425–442, 453–471, 1989 *Amer. Checical Society.*

Dell 'Agnola, G. and Nardi, S., Iron Uptake by Plants from Ferric–Humate Suspensions, pp. 179–194, 1986.

Hecht–Bucholz, Ch. and Ortmann, U., "Effect of Foliar Iron . . . In Iron–Chlorotic Soybean", pp. 647–659, 1986 *Jour. of Plant Nutrition.*

Hsu, H. H. and Ashmead, H. D.; "Effect of Urea and Ammonium Nitrate the Uptake of Iron Through Leaves", pp. 291–299, 1984, *Journal of Plant Nutrition.*

(ISBN 0–87371–083–5), Land Application of Sludge; 1987 *Lewis Publishers, Inc.*

(ISBN 0–89867–523–5), Land Application of Water Treatment Sludges; Impact and Management; 1990; *AWWA Research Foundation.*

Narkis, Nava and Rebhun, Menahem, "Stoichiometric Relationship Between Humic and Fulvic Acids and Flocculants", pp. 325–328; Jun., 1977; *Journal of AWWA.*

Recommended Fertilizers and Nutritional Sprays for Citrus, Mar. 1984, *U.S.D.A. Bulletin 536D.*

Reed, David Wm., "Effect of Urea, Amonium and Nitrate on Foliar Absorption of Ferric Citrate", pp. 1429–1437; 1988, *Journal of Plant Nutrition.*

*Primary Examiner*—Peter A. Hruskoci

*Attorney, Agent, or Firm*—Litman, McMahon & Brown

[57] ABSTRACT

A process is provided for preparing preferred iron humate products. The preferred iron humate products provide iron and other nutrients and organic matter for vegetation and supplementation of animal feedstocks. The preferred iron humate products are produced by using an iron salt coagulant that is relatively free of heavy metal contaminants and reacting the iron salt coagulant with naturally occurring humic substances such as those found in natural surface waters used in drinking water treatment facilities. According to the invention, iron is stoichiometrically reacted at a controlled pH with the humic and fulvic acid fractions in the water to precipitate an iron humate product precipitate. A preferred concentration of iron salt coagulants is used in order to minimize the formation of iron hydroxides.

11 Claims, No Drawings

IRON HUMATE PRODUCT

CROSS REFERENCE TO RELATED APPLICATION

The present application is a continuation-in-part of U.S. Ser. No. 08/018,287, entitled IRON HUMATE PRODUCT, filed Feb. 16, 1993, now U.S. Pat. No. 5,302,180, which is a continuation of U.S. Ser. No. 07/751,872, entitled PROCESS FOR PREPARING PREFERRED IRON HUMATES, filed Aug. 28, 1991, now U.S. Pat. No. 5,213,692.

BACKGROUND OF THE INVENTION

The present invention relates to a process for preparing a preferred iron humate product, compositions of preferred iron humate products and a method for treating chlorosis in vegetation and a method of providing nutrients to animals using preferred iron humate products.

Many agricultural crops and turf grasses must have commercial applications of iron nutrients in order to prevent or correct for iron deficiency otherwise known as plant chlorosis. Chlorosis can be physically detected by yellowing of leaves in trees, shrubs, and vegetables and yellowing of blades within turf grasses. Chlorosis hinders plant growth or yields and can also lessen food quality. Additionally, many soils are deficient in organic substances which can have a favorable effect on soil moisture retention, plant nutrient uptake and plant growth. There are many commercial iron nutrient sources available to correct for iron chlorosis such as ferrous sulfate and chelated irons such as sodium ferric ethylenediamine di-(O-hydroxy-phenol-acetate)("FeEDDHA") sold under the trade names Sequesterene 138-Fe and Libfer SP.

Livestock and poultry similarly require commercial addition of iron supplements to feedstocks in order to prevent anemia, a deficiency of red blood cells. Red blood cells contain hemoglobin, a protein which employs iron atoms to bind oxygen and transport it from the lungs to the tissues. An adequate supply of iron is essential to the production of hemoglobin, and a deficiency in hemoglobin results in anemia. The young of certain species, such as piglets, are especially susceptible to iron deficiency. Animals with mild forms of anemia exhibit retarded growth, while animals with severe anemia are at risk of death. Iron deficiency may also lower the resistance of the animal to disease. During the first days of life it is standard practice to supplement animals such as piglets with iron supplied orally, parenterally or by injection. In addition, the feed industry routinely adds iron compounds to supplement that which naturally occurs in feedstocks. Typical iron supplementation of animal feedstocks in the United States employs about 15 parts per million (ppm) of iron for beef cattle and sheep, 25 ppm for dairy cattle, 40 ppm for poultry feed and 80 ppm for swine feed. Most current iron feed supplements employ iron sulfate, which is unpalatable to animals and can cause stomach upset.

A separate problem has been the disposal of sludge or precipitates formed by coagulating raw water contaminants with iron and aluminum salts or the like at potable water treatment plants and at plants designed to remove the organic color from effluents from such sources as paper mills. This is especially true for surface waters which are characterized by their high content of dissolved organic color from the natural decaying of aquatic vegetation. These potable water treatment plants must use high coagulant dosages, which in turn, generate large quantities of sludge residue for disposal. Often the water treatment sludges are simply dumped back into the water source causing degradation of the water quality. Other currently preferred options for disposal of water treatment sludges are lagoon storage, disposal in landfills and discharge into sanitary sewers. Inadequacies in these disposal methods has led to an increased interest in the land application of water treatment sludge.

Important constituents of natural surface waters are aquatic humic substances. Humic substances are formed from the decomposition of plant and animal materials and comprise the largest fraction of natural organic matter in natural surface waters accounting for 40 to 60 percent of the dissolved organic carbon ("DOC"; DOC is defined as organic carbon particles smaller than 0.45 micrometers in diameter and may be in colloidal suspension rather than in solution).

Humic substances comprise a complex heterogeneous mixture of compounds that are not readily separated into discrete components. However, three subfractions of humic substances are generally recognized. These subfractions comprise humic acid, fulvic acid and humin. Humic acid is defined as the fraction of humic substances that is not soluble in water under highly acidic conditions ($pH<2.0$) but is soluble at higher pH values. Fulvic acid is defined as the fraction of humic substances that is soluble in water under all pH conditions. Humin is defined as the fraction of humic substances that is not soluble in water at any pH value.

Humic substances are removed from raw drinking water due to several problems associated with their presence. Humic substances are responsible for the yellow or brown organic color of natural surface waters. Humic substances act as a vehicle for the transport of toxic, water insoluble elements and organic micropollutants. Chlorine combines with aquatic humic substances to form chlorinated organic compounds, such as chloroform and complex chlorinated compounds, that may have negative effects on health. Humic substances also precipitate in water distribution systems where they lead to deterioration of tap water quality and increase the need for interior cleaning of pipes.

Traditionally, colored surface waters have been treated with alum (aluminum sulfate) which generates an aluminum containing sludge, which after dewatering, must be deposited in a secure landfill. Iron salt coagulants have been effectively used but often produce a sludge high in heavy metals due to the quality of the iron salt coagulant. Many of the commercial iron salt coagulants are produced from by-products from such sources as $TiO_2$ production or steel pickling and are typically high in heavy metals and organic contaminants.

When an iron salt coagulant is used as the primary coagulant to remove humic substances, it reacts to precipitate an iron humate residue. The inferior quality of many iron salt coagulants, such that the coagulants may include high concentrations of heavy metal contaminants, often results in iron humate products having unacceptable high concentrations of heavy metals so as to prevent land application of the iron humate products as well as use of such products in animal feed supplements.

Another problem with current potable water treatment methods is that these methods generally result in a water treatment sludge having unnecessarily high concentrations of hydrous metal oxides, such as iron hydroxides. Hydrous metal oxides are strong adsorbents of trace metals and phosphorus. When applied to the soil surrounding vegetation at high concentrations and high pH, iron hydroxides can result in metal deficiencies in the vegetation including iron deficiency. Also the presence of hydrous metal oxides results in the sorption of phosphorous from the soil reducing the availability of phosphorus to vegetation. Phosphorous is necessary for vegetation growth. Additionally, iron hydroxides do not dewater as well as iron humate products. The iron hydroxides form a somewhat gelatinous mass making sludge containing excess iron hydroxides harder to handle and more expensive to transport.

SUMMARY OF THE INVENTION

The present invention provides preferred iron humate products and processes for preparing preferred iron humate products adapted for use in treating chlorosis in vegetation and for use in supplementing animal feedstocks.

Existing water treatment processes focus primarily on producing high quality drinking water with little regard for the quality of the resultant sludge. The goal of the water treatment process of the present invention is to produce both high quality drinking water and a high quality sludge that is particularly well adapted for land application to provide useful nutrients to plants and for addition to animal feedstocks as an iron supplement.

The concentration of heavy metal contaminants in the resultant iron humate product is reduced by selecting a relatively pure iron salt coagulant that is free of or has a relatively low concentration of heavy metal contaminants.

The concentration of iron hydroxides in the resultant iron humate product is minimized by using a minimum dosage of iron salts to effect the required color removal of the raw water. The iron salt dosage is minimized by identifying and then coagulating the raw water at an optimum reaction or coagulation pH. The optimum coagulation pH is identified, preferably by analytical tests of water samples. A typical optimum coagulation pH ranges from 3.8 to 5.9 for most iron salt coagulants and most colored surface waters.

The resultant iron humate products are relatively insoluble, but still function as a source of iron nutrients during interactions with plants in soil media. The musty odor and low water solubility of such iron humate products are more attractive to animal palates than conventional iron sulfate animal feed additives. More soluble iron humate products may be produced by contacting the resultant iron humate products with a nitrogen source, so as to produce a nitrogen-enriched iron humate product that contains nitrogen in the range of 0.5 to 12 percent by weight as nitrogen with a minimum water soluble iron content of 50 ppm as iron. Both the unmodified iron humate product and the nitrogen-enriched iron humate product are relatively inexpensive and beneficial sources of iron and humic substances for application to and use by plants and animals.

OBJECTS AND ADVANTAGES OF THE INVENTION

Therefore, the objects of this invention are to provide a method for running a water purification facility to produce high quality drinking water and to produce a high quality sludge usable in providing needed nutrients to vegetation and to animals; to produce commercial, high quality, low cost, iron humate products especially suitable for addition to soil as an iron nutrient and organic soil additives for the benefit of vegetation; to produce commercial, high quality, low cost, iron humate products especially suitable for addition to animal feedstocks as an iron nutrient for the benefit of animals; to produce such iron humate animal feed products having iron available for animal metabolism and hemoglobin synthesis; to produce such iron humate animal feed products having increased palatability to animals; to produce such iron humate feed products which cause less stomach upset in animals than conventional iron feed supplements; to produce such iron humate feed products which increase digestibility of animal feeds such as hay and silage; to produce such iron humate products having a relatively low concentration of heavy metal contaminants; to produce such iron humate products through the use of high quality iron salts as coagulants in the water treatment process; to produce such iron humate products having a minimum concentration of iron hydroxides; to produce such iron humate products through the controlled addition of iron salt coagulants; and to produce a modified iron humate product with more soluble iron which is more rapidly available for plant uptake and the correction of iron deficiency.

Other objects and advantages of this invention will become apparent from the following description wherein are set forth, by way of illustration and example, certain embodiments of this invention.

DETAILED DESCRIPTION OF THE INVENTION

As required, detailed embodiments of the present invention are disclosed herein. However, it is to be understood that the disclosed embodiments are merely exemplary of the invention, which may be embodied in various forms. Therefore, specific composition and functional details disclosed herein are not to be interpreted as limiting, but merely as a basis for the claims and as a representative basis for teaching one skilled in the art to variously employ the present invention in virtually any appropriately detailed embodiment.

The present invention concerns the production of preferred iron humate products from water treatment processes to be used in treating vegetation and in particular crops and the like suffering from iron deficiencies generally referred to as chlorosis, and to be used as an animal feed supplement to provide iron for animal metabolism and hemoglobin synthesis.

The preparation of the iron humate products or residuals involves the controlled addition of an iron salt coagulant to raw water in a water treatment plant. The iron salt coagulant reacts with organic color-producing aquatic humic substances or species in the raw water to form an iron humate product or precipitate which when applied to plants or added to animal feed provides useful organic matter and nutrients such as iron. The preferred iron salt coagulant for the process is ferric sulfate or polyferric sulfate. Other acceptable iron salts are ferric chloride, ferrous chloride, polyferric chloride, and ferrous sulfate and the like. In order to be acceptable the iron salt coagulant used should be of high purity in terms of generally being free of or having a relatively low heavy metal and organic contamination, such as organic corrosion inhibitors and trihalomethane precursors.

Preferably the iron salt coagulant is produced from virgin iron sources and virgin acid sources so as to minimize the extraneous contaminants which may not be environmentally safe to apply to soil or may be harmful to vegetation or animals. Table I gives a typical specification of a ferric sulfate coagulant that is suitable for treating at least some raw surface water under the present invention. However, allowable contaminant levels may differ depending on the water to be treated and the desired end use application of the recovered iron humate product. The allowable contaminants specified in Table I are stricter than the American Water Works Association (AWWA) current standard for ferric sulfate because this standard only addresses the effects of contaminants in the coagulant on the resultant treated water and not the quality of the resultant sludge residue.

TABLE I

| Impurity | Maximum Impurity Concentration (mg/kg) |
|---|---|
| Arsenic | 2 |
| Cadmium | 2 |
| Chromium | 5 |
| Lead | 10 |
| Mercury | 1 |
| Selenium | 3 |
| Silver | 5 |
| Nitrites | 75 |
| Total Organic Carbon | 15 |
| Copper | 5 |
| Zinc | 10 |
| Manganese | 90 |
| Barium | 6 |
| Chloride | 100 |
| Fluoride | 60 |
| Titanium | 50 |
| Nitrates | 150 |
| Sodium | 1000 |

The most critical parameter affecting the quality of the resultant iron humate product is the reaction or coagulation pH. The optimum coagulation pH will vary depending on the type of surface water, the concentration of organic species present and the type of iron salt coagulant used. The optimum pH in an actual water treatment plant is determined using analytical jar tests of water samples in an iterative approach. A selected quantity of water to be treated is collected in several jars. The pH of the water in the jars is adjusted by the addition of an acid such as sulfuric acid such that the pH of each of the jars is different. A selected quantity of iron salt coagulant is added to each jar and the contents are agitated and then allowed to react or coagulate and then settle.

The pH of the jar having the greatest raw water color reduction is identified. Several more jars are filled with a selected quantity of the water to be treated. The pH of the water in these jars is adjusted to match the pH identified in the first jar test as resulting in the greatest raw water color reduction.

Various quantities of iron salt coagulant are then added to these jars. The contents are agitated and then allowed to react or coagulate and then settle. The smallest quantity of iron salt coagulant effecting a preselected or desired level of color reduction is identified.

Using the identified minimum quantity of iron salt coagulant resulting in the desired color reduction another set of jar tests can be conducted to identify the pH resulting in the greatest color reduction with the identified minimum quantity of iron salt coagulant. Typically two iterations of-the jar tests are completed to identify an optimum coagulation pH for effecting color reduction and the minimal quantity of iron salt coagulant at that pH to effect the desired reduction. Typical optimum coagulation pH values range from 3.8 to 5.9 for most iron salt coagulants and most colored surface waters.

Controlling the optimum pH ensures using the minimum dosage of iron salt coagulant to effect the required color removal of the raw water. It is theorized that excess iron salts form insoluble iron hydroxides which are not taken up by plants as opposed to the preferred iron humate products. Because iron hydroxides are strong adsorbents of trace metals and phosphorous, the presence of the hydroxides in the sludge applied to vegetation can result in metal deficiencies in plants including phosphorous and iron deficiencies. The adsorption of iron from the soil by iron hydroxides may reduce the availability of iron from the preferred iron humate product. Additionally, iron hydroxides do not dewater as well as iron humate products and form a gelatinous mass. The production of excess iron hydroxides results in a product that is more difficult to handle and more expensive to transport.

Although the iron humate products are also very insoluble, they can still function as a source of iron nutrients during interactions with plants in soil media and will also function as an oral source of iron nutrients available to animals. Although it is not the intent of applicant to be bound to any specific theory of how such iron is used by the vegetation, it is theorized that in the soil, the iron humate products are converted into a useable form by vegetation allowing the uptake of iron by the vegetation. There is empirical evidence that iron humate products supply animals with a viable source of elemental iron which is available for hemoglobin synthesis.

In an actual water treatment plant application, analytical jar tests should be conducted frequently to verify the optimum treatment pH setpoint and minimum effective iron dosage rate and to compensate for changes in the chemical composition of the raw water to be treated. Although an excess iron salt coagulant dosage will still produce a high quality drinking water, it will produce excess and undesirable iron hydroxides in precipitates removed from the water and used herein to provide nutrients to vegetation.

The preferred water treatment process of the present invention may be incorporated into a continuous flow water treatment system or a batch water treatment system. The steps of the process of the present invention are essentially the same when incorporated into either a continuous flow or batch treatment system except that the steps are time-based in a batch reactor and position or location-based in a continuous flow reactor.

In a continuous flow water treatment system the pH of the raw water in an influent raw water stream is initially lowered to a previously identified optimum coagulation pH in an acidification zone. The pH may be lowered by the addition of an auxiliary acid such as sulfuric acid or by means such as bubbling $CO_2$ into the raw water to form carbonic acid and by other means generally known in the art.

The efficiency of the treatment process appears to improve when the pH of the raw water is lowered prior to the addition of an iron salt coagulant as opposed to lowering of the pH concurrently with or after the addition of an iron salt coagulant. However, the pH of the raw water may be lowered before, after or during the addition of the iron salt coagulant. Also, for pH control and iron salt coagulant dosage efficiency purposes, it is preferred to use an iron salt coagulant with very low free acidity, so that the pH may be controlled independent of the iron salt dosage. As discussed above, the optimum coagulation pH may change due to changes in the composition of the raw water. Analytical jar tests are conducted regularly to identify changes in the optimum coagulation pH and the pH of the water to be treated is adjusted accordingly.

Downstream of the acidification zone, an iron salt coagulant is added to the influent raw water stream in a flash mixing zone to form a treatment solution. The iron salt coagulant is added to the influent raw water stream at a rate previously calculated to provide the minimum dosage of iron salt coagulant necessary to effect the required color removal from the raw water. As discussed above analytical jar tests are conducted regularly to identify any changes in the minimum dosage necessary to effect the required color removal due to changing characteristics of the raw water. The rate of addition of iron salt coagulant is adjusted to correspond to any identified changes in the minimum dosage requirement.

Impellers are preferably used in the flash mixing zone to provide rapid, thorough mixing of the raw water and the iron salt coagulant, however it is foreseeable that other rapid mixing means may be incorporated into the process of the present invention. The iron salt coagulant and the raw water are preferably mixed in the flash mixing zone for a minimum of 15 seconds. This initial mixing is followed by at least 3 minutes and preferably at least 10 minutes of additional mixing such as is available in a flocculation type mixing zone located downstream of the flash mixing zone. The reaction of the iron salt coagulant with the humic substances and other organic matter in the raw water is nearly complete within three minutes for temperate waters and longer for colder waters. The reaction of iron salt coagulant and humic substances forms iron humate products.

After the reaction is complete, the treatment solution is allowed to settle with the iron humate products precipitating out of the solution to form a solids residue. After settling, the resultant treated water is separated from the solids residue (whether as a floating flocculent or as a precipitate that forms a lower solids or sludge layer in the water). The treated water is preferably chlorinated after separation from the solids residue to minimize the formation of chlorinated organics which will contaminate the residue and the drinking water.

The iron humate product in the form of the solid residue is concentrated and dried by conventional equipment being used in the water treatment industry such as settling basins, clarifiers, mechanical filters, sludge drying beds and commercial sludge dryers. The resultant iron humate product typically dewaters very effectively and can achieve air dry solids concentrations up to 88% by weight solids. The iron humate product of the present invention is characterized by an iron concentration ranging from about 5 to about 45 percent by weight on a dry solids basis and preferably about 28 to about 33 percent by weight on a dry solids basis, low toxic organic and heavy metal contamination, high concentration of humic substances (an elemental carbon concentration generally greater than about 15 percent by weight on a dry and ash free basis, with a preferred concentration greater than about 30 percent) and minimal concentration of iron hydroxides. The solids residue is characterized by a concentration of iron complexed as iron hydroxide of less than 25 percent by weight and preferably less than 10 percent by weight of the total iron present. After air drying, it has a medium brown color and has the consistency of a fine porous soil. The iron humate remains nearly insoluble in water (less than 1 ppm) or when stored in segregated piles, but slowly releases iron to the vegetation in mixed soil conditions.

More soluble, nitrogen-enriched iron humate products are produced by contacting the partially hydrated iron humate products with a commercially available nitrogen source such as ammonia, ammonium hydroxide, urea, ammonium nitrate, and potassium nitrate. The resultant nitrogen-enriched iron humate preferably contains nitrogen in the range of 0.5 to 12 percent by weight as nitrogen with a minimum water soluble iron content of 50 ppm as iron. The nitrogen-enriched iron humate also turns from a medium brown color to a rich dark brown color. The mixture of the nitrogen-enriched iron humate with water forms a dark brown solution, while the filtrate from mixing water with the iron humate is colorless.

Iron humate products can also be employed to provide iron and humic acid to animals such as cattle, swine, poultry, sheep, horses, turkeys, household pets and the like. Iron humate can be fed to animals of all ages, either directly, by mixing with a conventional feedstock, or by blending with an animal feed premix, that is, a uniform mixture of one or more micro-ingredient additives with a diluent, such as a carrier or binder, which is in turn blended with a conventional feedstock. Premixes can also be employed for preparation of fertilizer products for application to vegetation.

Such premixes may include about 1% to about 35% elemental iron on a dry weight basis. Especially preferred premixes contain about 15% to about 20% iron on a dry weight basis. Such premixes also include a concentration of humic substances of about 2% to about 70%, with an especially preferred concentration of about 20% to about 60%. Suitable micro-ingredients include iron, phosphorus, calcium, potassium, sodium, zinc, copper, magnesium, manganese, selenium, iodine, cobalt, fluorine, or any other suitable element or element-containing mineral or mixture thereof. Where the premix is to be fed to animals, Vitamin A, Vitamin B12, Vitamin C, Vitamin D, Vitamin E, or any other suitable vitamin, or mixture thereof may also be employed as a micro-ingredient.

Where iron humate is added to conventional feedstocks, sufficient humate is added to provide a feedstock having from about 15 to about 100 parts per million of elemental iron, depending on the species to be fed. Sheep and beef cattle are typically fed about 15 parts per million of elemental iron, while dairy cattle are fed about 25 parts per million, poultry about 40 parts per million and swine about 80 parts per million.

Examples of the processes in accordance with the invention which follow are for the purpose of demonstrating specific processes in accordance with the invention and are not intended to be limiting to the scope of the invention or claims.

EXAMPLE 1

A plant trial was conducted to treat water from the Hillsborough River in Tampa, Fla. with ferric sulfate for color removal. Sulfuric acid was added to the water upstream of a flash mix tank to maintain a desired coagulation pH at a setpoint of 4.5 pH units. A high purity ferric sulfate in accordance with the invention was added at the entrance of the flash mix tank to maintain an average iron dosage of 21 milligrams/liter to treat an average raw water color of 105 standard color units (SCU) to a maximum of 15 standard color units before chlorination. The raw water had a dissolved organic carbon (DOC) content that averaged 15.9 ppm (an indication of the dissolved humic substances present). The DOC in the water was reduced by application of ferric sulfate in accordance with the invention by an average of over 72% by weight. The resultant iron humate sludge precipitate was concentrated using a clarifier, mechanically dewatered using a belt filter press to 18% by weight solids and then dried in a conventional sludge drying bed to a dry solids content of 88% by weight. This unmodified iron humate contained 32% by weight iron on a dry solids basis. The humate material, when mixed with excess water, produced a clear filtrate with less than 1 milligram/liter soluble iron. Additional elemental and composition data relating to the unmodified iron humate product are provided in Tables 2 and 3. Data for Tables 2 and 3 were taken from samples of unmodified iron humate taken randomly from the resultant iron humate product.

EXAMPLE 2

The unmodified iron humate product from above Example 1 was contacted with anhydrous ammonia in excess in a pressure vessel at 50 pounds per square inch (psi) for 48 hours at ambient temperatures and then dried. The resultant nitrogen content was 4.71% by weight on a dry weight basis. The nitrogen-enriched iron humate had turned to a rich dark brown. The iron solubility had increased by a factor of greater than 500. Elemental and compositional analysis of the ammonia-nitrogen enriched iron humate product are provided in Tables 2 and 3. Data for Tables 2 and 3 were taken from samples of nitrogen-enriched iron humate taken randomly from the resultant iron humate product.

TABLE 2

| COMPOSITIONAL ANALYSIS* | | | | | |
|---|---|---|---|---|---|
| | Percent by weight | | | | |
| | pH | Ash | Moisture | Volatiles | Iron |
| Unmodified | 4.8 | 49 | 12 | 39 | 32 |
| Nitrogen-Enriched | 8.3 | 36 | 14 | 50 | 23 |

*The weight percents for ash, moisture, volatiles and iron were determined after roasting the resultant unmodified and ammonia-nitrogen enriched iron humate products at 1000° Centigrade until dry.

TABLE 3

| ELEMENTAL ANALYSIS | | |
|---|---|---|
| | Percent by weight of dry and ash free humate | |
| Element | Unmodified Iron Humate | Nitrogen-Enriched Iron Humate |
| Carbon | 40 | 43 |
| Hydrogen | 4 | 6 |
| Nitrogen | 0.9 | 4 |

TABLE 3-continued

| ELEMENTAL ANALYSIS | | |
|---|---|---|
| | Percent by weight of dry and ash free humate | |
| Element | Unmodified Iron Humate | Nitrogen-Enriched Iron Humate |
| Oxygen | 55 | 46 |

EXAMPLE 3

100 pounds (dry weight) of the unmodified iron humate product from above Example 1 was mixed with 29 pounds of urea and then stored at ambient temperature and pressure for 24 hours in a closed atmosphere to produce a nitrogenen-riched iron humate product. The nitrogen content of the nitrogen-enriched iron humate had risen from 0.6 to 10.9 percent by weight. The nitrogen-enriched iron humate had turned to a rich dark brown. The iron solubility had increased by a factor of more than 100.

EXAMPLE 4

Plugs of turf grass and soil from a horticultural field laboratory were prepared for testing in triplicate with dosages of 2.5, 7.5 and 25.0 pounds of iron humate product made in accordance with Example 1 and Example 3 per acre applied to separate plots. Uniform rates of nitrogen, phosphorous, and potassium were applied to all plots. Visual ratings were performed bi-weekly and clippings for growth rate and iron uptake measurements were conducted weekly for two weeks. Both the urea-nitrogen enriched iron humate of Example 3 and the unmodified iron humate of Example 1 were compared against equivalent iron dosages from other iron sources, in particular, ferrous sulfate, a commercial iron chelate sold under the trademark Sequesterene 138-Fe and a control group with no added iron. The results of the iron uptake and vegetation growth measurements for the first two weeks are shown on Table 4. In general, the nitrogen-enriched iron humate samples outperformed the unmodified iron humate samples. Although the commercial iron products outperformed the iron humates on an efficiency basis, higher dosages of the iron humates outperformed the lower dosages of the commercial organic chelate. All the iron humate samples outperformed the control samples and also had a much greener appearance.

TABLE 4

| Iron Source | lbs Fe/ Acre | Fe Uptake (mg Fe/pot*) | Week 1 Growth (g/pot) | Week 2 Growth (g/pot) | Total Growth |
|---|---|---|---|---|---|
| 1. Iron Humate | 2.5 | 0.182 | .42 | .60 | 1.02 |
| 2. Iron Humate | 7.5 | 0.151 | .43 | .60 | 1.03 |
| 3. Iron Humate | 25.0 | 0.183 | .51 | .59 | 1.10 |
| 4. Nitrogen Enriched Iron Humate | 2.5 | 0.201 | .46 | .69 | 1.15 |
| 5. Nitrogen Enriched Iron Humate | 7.5 | 0.148 | .40 | .54 | .94 |
| 6. Nitrogen Enriched Iron Humate | 25.0 | 0.224 | .42 | .69 | 1.11 |

TABLE 4-continued

| Iron Source | lbs Fe/ Acre | Fe Uptake (mg Fe/pot*) | Week 1 Growth (g/pot) | Week 2 Growth (g/pot) | Total Growth |
|---|---|---|---|---|---|
| 7. Sequesterene 138-Fe | 2.5 | 0.176 | .52 | .67 | 1.19 |
| 8. Sequesterene 138-Fe | 7.5 | 0.301 | .58 | .64 | 1.22 |
| 9. Ferrous Sulfate | 25.0 | 0.245 | .59 | .65 | 1.24 |
| 10. Control | 0 | 0.099 | .35 | .51 | .86 |

*Plant growth is expressed in g/pot which indicates the mass of the plant growth per pot in which plants are grown.

EXAMPLE 5

Iron uptake in young citrus trees was tested for the nitrogen-enriched and unmodified iron humates of Examples 2 and 1 respectively and compared against two commercial iron chelates sold under the trademarks Sequesterene 138-Fe and LibFer SP and a control group with no added iron nutrients in a soil incubation study over 70 days. The results of the tissue analysis for iron are shown in Table 5. In Table 5, the headings Carrizo and Swingle represent the root stock of the young citrus trees on which the iron sources were applied. The ammonia-nitrogen enriched iron humate of Example 2 showed dramatically higher content than all other iron sources tested. The unmodified iron humate of Example 1 showed slightly lower to equivalent performance in comparison to the commercial iron chelates. All tested iron sources performed better than the control group.

The preliminary economics indicate that the iron humate products of the present invention are commercially viable compared to available iron sources. The analysis for iron of tissue samples from the citrus leaves of trees treated with the nitrogen-enriched iron humate product indicate that these leaves contained more iron than the leaves of trees treated with Sequesterene 138-Fe. The cost of an effective amount of the nitrogen-enriched iron humate product would be a fraction of the cost for a similarly effective amount of Sequesterene 138-Fe based upon the price thereof at the time of filing of this application, while still maintaining a healthy profit for the iron humate producer.

The iron humate compositions of the present invention are usable in conjunction with a variety of vegetation and is usable not just in conjunction with plants grown in fields or the like, but also in such related areas as potting soil.

TABLE 5

Concentration of Iron in Leaves of Two Citrus Rootstocks 45 Days After Application of Iron Source

| Iron source | Rate g Iron/plant | Iron in Leaves (mg/kg) Carrizo | Swingle |
|---|---|---|---|
| Nitrogen-Enriched Iron Humate | 2 | 390 | 240 |
| Nitrogen-Enriched Iron Humate | 1 | 338 | 213 |
| Nitrogen-Enriched Iron Humate | 0.5 | 241 | 104 |
| Unmodified Iron Humate | 2 | 235 | 67 |
| Sequesterene 138-Fe | 0.5 | 225 | 98 |
| Sequesterene 138-Fe | 1 | 218 | 61 |
| Sequesterene 138-Fe | 0.25 | 216 | 112 |
| Unmodified Iron Humate | 1 | 205 | 98 |

TABLE 5-continued

Concentration of Iron in Leaves of Two Citrus Rootstocks 45 Days After Application of Iron Source

| Iron source | Rate g Iron/plant | Iron in Leaves (mg/kg) Carrizo | Swingle |
|---|---|---|---|
| Unmodified Iron Humate | 0.5 | 198 | 70 |
| LibFer SP | 0.25 | 198 | 58 |
| Libfer SP | 1 | 190 | 61 |
| Libfer SP | 0.5 | 180 | 139 |
| CONTROL | 0 | 164 | 44 |

EXAMPLE 6

Sow's milk contains only about 1 part per million of elemental iron. In addition, piglets are born with a relatively low total body iron content, most of which is already incorporated into hemoglobin. Consequently, nursing piglets raised in a confined environment without access to soil as an iron source are well known to be subject to iron deficiency anemia. Piglets with chronic anemia may exhibit poor growth, listlessness, rough hair coat, wrinkled skin, and paleness of the snout, ears and mucous membranes. Blood hemoglobin levels in piglets with chronic anemia may range from about 5 to about 8 grams/deciliter (g/dl). Piglets with acute anemia may experience labored breathing or a spasmodic movement of the diaphragm known as "thumps". Blood hemoglobin levels in piglets with acute anemia may fall to 3 to 5 g/dl and the piglets may die suddenly.

For this reason, an iron supplement such as ferrous sulfate may be conventionally administered to nursing piglets.

Availability of elemental iron from iron humate for animal metabolism and hemoglobin synthesis in piglets in accordance with the present invention was evaluated in comparison with equivalent iron dosages from other iron sources, e.g., Pig Oral Iron (supplied by Carl S. Akey, Inc.) and Iron Dextran (supplied by Durvet, Inc.). A total of twelve litters of nursing piglets were randomly assigned to three groups. Two groups were fed daily for 28 days with 75 grams/litter of elemental iron supplied from either iron humate or Pig Oral Iron. Aliquots of 25 grams of the respective supplement were set out in small pans in the farrowing crates three times daily. Piglets in the third group were injected with 100 mg of elemental iron supplied in 1.0 milliliter of Iron Dextran within 24 hours after birth.

Hemoglobin concentrations

Blood samples were drawn from each piglet on day 1, prior to initiation of the treatments and subsequently on days 3,5,7,10,14,21, and 28. Three to five milliliters of whole blood were drawn from each piglet and frozen until analysis. Hemoglobin was measured using a kit (Sigma Diagnostics, St. Louis, Mo., kit number 525). Sows were fed a standard lactation diet and piglets had minimal access to sow feed. The piglets were not creep fed. As shown in Table 6–1, hemoglobin levels were approximately equal on day 1. They decreased by day 3, and began to increase by day 5 or 7. This pattern was repeated for all piglets, regardless of the iron source. By day 10, iron humate-fed piglets exhibited greater hemoglobin concentrations than the other piglets, and this pattern prevailed throughout the remainder of the trial. Piglets fed Pig Oral-Iron exhibited a plateau in hemoglobin concentrations about day 10 or 14 and piglets receiving Iron-Dextran peaked on day 10 or 14 and decreased steadily to day 28. By day 28 hemoglobin concentrations for iron-humate fed piglets were 17% and 42% higher than for piglets receiving Pig Oral Iron or Iron Dextran, respectively. Blood hemoglobin levels increased by 3.77% in the Iron Humate-fed group, decreased by 16.4% in the Pig Oral Iron group, and decreased by 26.4% in the Iron Dextran group. Since no other source of iron was available to the piglets for hemoglobin synthesis other than the negligible amount present in sow's milk, it can be concluded that iron humate provides a source of supplemental iron that is available for hemoglobin synthesis in the nursing piglet.

TABLE 6-1

HEMOGLOBIN LEVELS OF PIGLETS 0-28 DAYS OF AGE FED EITHER IRON-HUMATE OR PIG ORAL-IRON OR INJECTED WITH IRON DEXTRAN AS THE SOLE SOURCE OF IRON DURING A 28 DAY LACTATION

TABLE 6-1

HEMOGLOBIN LEVELS OF PIGLETS 0-28 DAYS OF AGE FED EITHER IRON-HUMATE OR PIG ORAL-IRON OR INJECTED WITH IRON DEXTRAN AS THE SOLE SOURCE OF IRON DURING A 28 DAY LACTATION

| | HEMOGLOBIN LEVEL, G/DL | | |
|---|---|---|---|
| DAY/ TREATMENT | IRON-HUMATE[a] | PIG ORAL-IRON[b] | IRON DEXTRAN[c] |
| 1 | 10.08 | 10.69 | 10.00 |
| 3 | 7.44 | 7.59 | 7.97 |
| 5 | 7.98 | 7.25 | 8.10 |
| 7 | 8.16 | 8.25 | 8.78 |
| 10 | 9.83 | 8.39 | 9.33 |
| 14 | 10.34 | 8.33 | 9.34 |
| 21 | 11.28 | 9.07 | 8.44 |
| 28 | 10.46 | 8.94 | 7.36 |

[a]Each value represents an average pooled from thirty-nine piglets from four replicate litters.
[b]Each value represents an average pooled from forty-one piglets from four replicate litters.
[c]Each value represents an average pooled from thirty-five piglets from four replicate litters.

Growth Performance

Litters were weighed weekly on days 1,7,14,21, and 28. As shown in Table 6-2, litter weights were approximately equal on day 1 and all litters exhibited relatively steady growth. Iron-humate fed piglets showed an increase in litter weight at days 14 and 28 as compared to either Pig Oral Iron or Iron-Dextran. On day 28 the Iron humate-fed group had increased in weight by 369%, the Pig Oral Iron group by 319%, and the Iron Dextran group by 343%.

TABLE 6-2

LITTER GROWTH OF PIGLETS 0-28 DAYS OF AGE FED EITHER IRON-HUMATE OR PIG ORAL-IRON OR INJECTED WITH IRON DEXTRAN AS THE SOLE SOURCE OF IRON DURING A 28 DAY LACTATION.

| | LITTER WEIGHT[a], KG | | |
|---|---|---|---|
| DAY/ TREATMENT | IRON-HUMATE | PIG ORAL-IRON | IRON DEXTRAN |
| 0 | 28.5 | 31.6 | 29.3 |
| 7 | 49.3 | 50.3 | 51.2 |
| 14 | 80.9 | 78.6 | 75.3 |
| 21 | 111.1 | 105.7 | 103.6 |
| 28 | 133.8 | 132.3 | 129.7 |
| LITTER GAIN, KG | | | |
| 0-14 DAYS | 52.4 | 47.0 | 46.0 |
| 0-28 DAYS | 105.3 | 100.7 | 100.4 |

[a]Each weight represents four replicate letters.

Individual piglet weights were recorded on days 1 and 28. As shown in Table 6-3, the Iron Humate fed piglets gained an average of 433%, the Pig Oral Iron fed piglets an average of 361%, and the Iron Dextran-injected piglets an average of 395%.

TABLE 6-3

GROWTH OF PIGLETS 0-28 DAYS OF AGE FED EITHER IRON-HUMATE OR PIG ORAL-IRON OR INJECTED WITH IRON DEXTRAN AS THE SOLE SOURCE OF IRON DURING A 28 DAY LACTATION

| | PIGLET WEIGHT[a], KG | | |
|---|---|---|---|
| DAY/ TREATMENT | IRON-HUMATE | PIG ORAL-IRON | IRON DEXTRAN |
| 0 | 1.29 | 1.40 | 1.46 |
| 28 | 6.88 | 6.46 | 7.22 |
| PIGLET GAIN, KG | | | |
| 0-28 DAYS | 5.59 | 5.06 | 5.76 |

[a]Each weight represents the piglets from four replicate litters.

Table 6-4 shows survival rates for litters fed with iron humate or Pig Oral Iron or injected with Iron Dextran. The Iron humate and Pig Oral Iron fed litters were slightly larger at birth than the Iron Dextran injected group.

TABLE 6-4

LITTER SIZE OF SOWS WHERE PIGLETS 0-28 DAYS OF AGE WERE FED EITHER IRON-HUMATE OR PIG ORAL-IRON OR INJECTED WITH IRON DEXTRAN AS THE SOLE SOURCE OF IRON DURING A 28 DAY LACTATION.

| | LITTER SIZE[a], KG | | |
|---|---|---|---|
| DAY/ TREATMENT | IRON-HUMATE | PIG ORAL-IRON | IRON DEXTRAN |
| 0 | 11.3 | 11.3 | 10.0 |
| 28 | 9.8 | 10.3 | 9.0 |
| % SURVIVAL | 86.7 | 91.2 | 90.0 |

[a]Each number represents the piglets from four replicate litters.

Although the numbers of piglets and litters is small, the growth data depicted in Tables 6-2 through 6-4 provide evidence that the elemental iron in Iron Humate is available to the piglet for growth and hemoglobin synthesis. Piglets fed iron Humate grew faster than those fed Pig Oral Iron and similarly to those receiving Iron Dextran.

It is to be understood that while certain forms of the present invention have been illustrated and described herein, it is not to be limited to the specific forms or compositions described.

What is claimed and desired to be secured by Letters Patent is as follows:

1. An iron humate product having:

(a) an iron concentration ranging from about five to about forty-five percent by weight on a dry solids basis;

(b) a concentration of humic substances equal to or greater than about fifteen percent by weight; and (c) said product has a concentration of iron complexed as iron hydroxides that is less than about 25 percent by weight of total iron present, wherein said iron humate product is produced by adding a sufficient concentration of an iron salt coagulant to a quantity of raw water having a pH between about 3.8 and about 5.9 to reduce the organic color of the water and form a solid residue containing said iron humate product.

2. The iron humate product as described in claim 1 wherein:

(a) said product has a concentration of iron complexed as iron hydroxides that is less than about 10 percent by weight of total iron present.

3. The iron humate product as described in claim 1 wherein:

(a) said iron salt coagulant is selected from the group consisting of ferric sulfate, ferrous sulfate, polyferric sulfate, ferric chloride, ferrous chloride, polyferric chloride, and mixtures thereof.

4. An iron humate product prepared in accordance with a method for treating a quantity of colored raw water including humic substances comprising the steps of:

(a) adding an iron salt coagulant to said raw water to form a treatment solution;

(b) controlling the pH of said treatment solution between about 3.8 and about 5.9 to provide for the addition of a minimum amount of said iron salt coagulant to the raw water to reduce the color of the raw water to a preselected level and to produce an iron humate product wherein the concentration of iron complexed as iron hydroxide in the iron humate product is less than about 25 percent by weight on a dry solids basis;

(c) separating said iron humate product from said treatment solution; and (d) concentrating and drying said iron humate product so as to form a solid residue having a concentration of humic substances greater than about 15% by weight.

5. An iron humate product prepared in accordance with the method of claim 4 wherein said step of controlling includes:

(a) periodically sampling the raw water;

(b) finding the pH value of the sampled water to produce an optimum coagulation effect in the water;

(c) adding iron salt coagulant to find the optimum concentration of iron salt coagulant to coagulate components of the water to form iron humate without producing substantial quantities of iron hydroxides; and (d) adjusting the addition of the iron salt coagulant for producing said optimum concentration with said water.

6. An iron humate product prepared in accordance with the method of claim 4 wherein said method includes the step of:

(a) selecting said iron salt from the group consisting of ferric sulfate, ferrous sulfate, polyferric sulfate, ferric chloride, ferrous chloride, polyferric chloride, and mixtures thereof.

7. An iron humate product prepared in accordance with the method of claim 4 wherein the concentration of iron complexed as iron hydroxide in the iron humate product is less than about 10 percent by weight on a dry solids basis.

8. An iron humate product prepared in accordance with the method of claim 4 wherein the concentration of humic substances in said product is at least 15 percent by weight.

9. An iron humate product prepared in accordance with a method comprising the steps of:

(a) adding a sufficient concentration of an iron salt coagulant to a quantity of raw water containing humic substances and having a pH of from about 3.8 to about 5.9 to reduce the organic color of the water to a preselected level while producing a solid residue iron humate product such that the concentration of iron complexed as iron hydroxide in the iron humate product is less than about 25 percent by weight of said product on a dry solids basis and the concentration of humic substances is greater than about 15% by weight.

10. An iron humate product prepared in accordance with the method of claim 9 wherein said method includes the step of:

(a) selecting said iron salt from the group consisting of ferric sulfate, ferrous sulfate, polyferric sulfate, ferric chloride, ferrous chloride, polyferric chloride and mixtures thereof.

11. An iron humate product prepared in accordance with the method of claim 10 wherein the concentration of iron complexed as iron hydroxide in the iron humate product is less than about 10 percent by weight on a dry solids basis.

* * * * *